Nov. 6, 1945.  R. R. HAYS  2,388,653
HELICOPTER
Filed Oct. 8, 1943  2 Sheets-Sheet 2

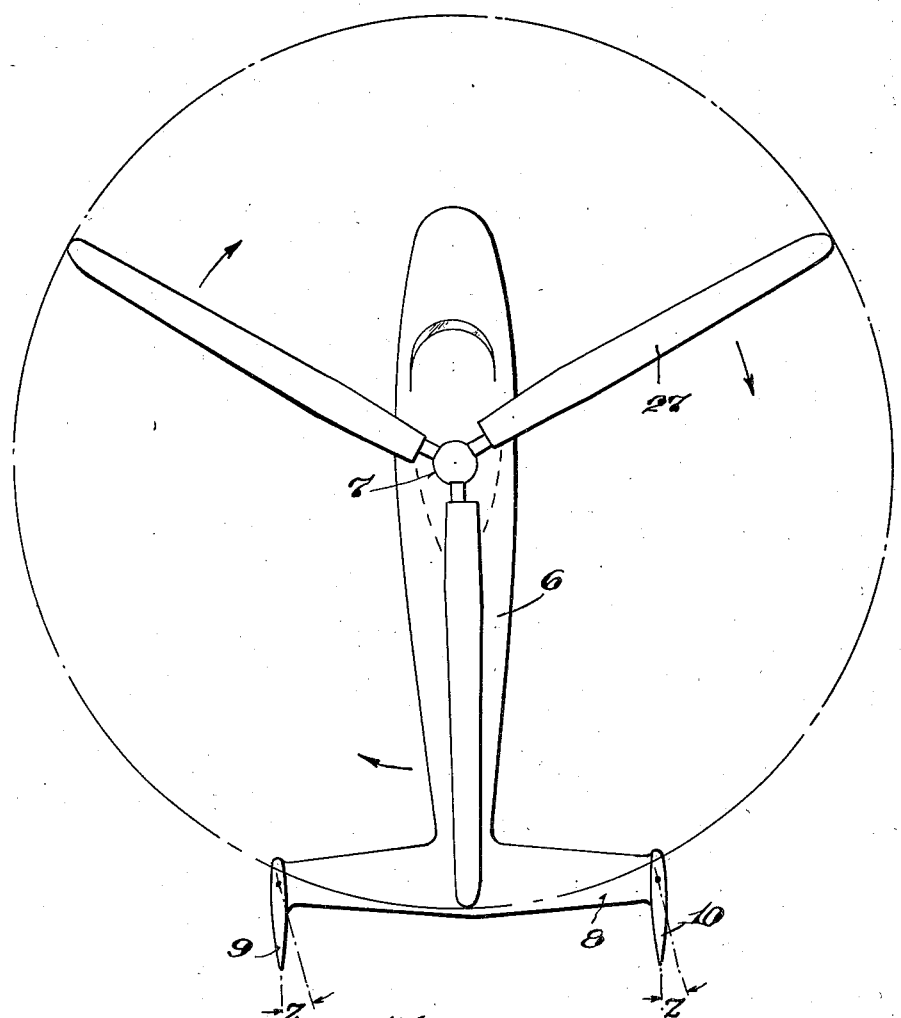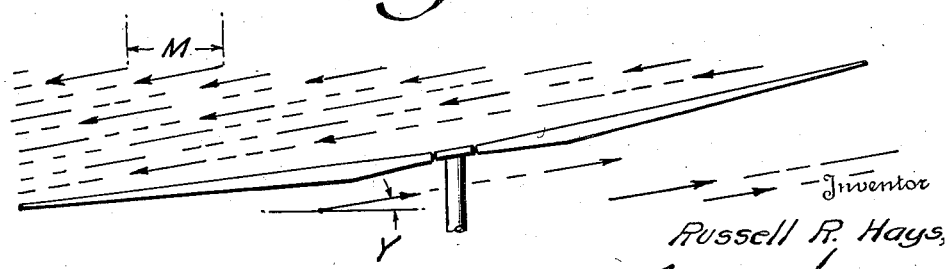

Inventor
Russell R. Hays,
By Harold Kilcoyne
Attorney

Patented Nov. 6, 1945

2,388,653

UNITED STATES PATENT OFFICE 2,388,653

HELICOPTER

Russell R. Hays, Lawrence, Kans.

Application October 8, 1943, Serial No. 505,527

13 Claims. (Cl. 244—17)

This invention relates to helicopters and more particularly to an anti-torque mechanism for use with helicopteral machines having a single lifting propeller.

At a uniform rate of rotation the torque necessary to operate a propeller, disregarding all other considerations, is equal to the drag of the blades in their plane of rotation, which is usually considered as acting at the blades' center of percussion, times a moment arm which is the distance from the center of percussion to the propeller's axis of rotation. Since greater lifting efficiency is associated with a large span in such propellers, it follows that nullifying of this torque to prevent counter-rotation of the supporting fuselage is a problem of first magnitude in all helicopter design.

A wide variety of anti-torque arrangements are available, and in general these may be divided into two classes; first, those that are mounted in or on the blades and act in direct opposition to the drag thereof; and, second, those devices mounted on the fuselage of the supporting machine to prevent its counter-rotation. Because of the magnitude of the force required in any instance, it is evident that any anti-torque mechanism must introduce innumerable attendant problems, with the result that to date none of the devices heretofore used have been able to avoid structural complexity directly translatable into cumbersome appearance and poor translational efficiency.

That the effect of the torque of a lifting propeller on the fuselage of a supporting machine might be counteracted by a counter-torque mechanism overcoming the disadvantages of prior devices and which adapts the flapping action of the blades during translational flight to an anti-torque means during hovering flight resulted from a consideration of the part inertia plays in the functioning of a conventional lifting propeller or rotor during translational flight. As this adaptation requires periodic movement or "wobbling" of the propeller as a whole about its point of attachment to the supporting pylon, the dynamics of such action will be clarified by a brief analysis of the forces involved in the normal "flapping" of rotor blades.

Under static lift alone the blades raise up to a "coning" position in which the lift is in equilibrium with a transverse component of the centrifugal force effective upon them, this centrifugal component coming into being with lifting of the blades from a "flat" plane of rotation and varying as the tangent of the angle of coning.

With translational travel, however, the rotor as a whole tilts rearwardly relative to its axis of rotation so that relative to the initial plane of rotation the blades at forward phases of rotation now have a coning angle approximately twice their original coning angle, whereas at trailing phases of rotation the coning angle now approximates zero.

Assuming that the lift on the rotor as a whole is approximately constant as would be the case during the transition from vertical ascent to translational flight with a helicopter or with an Autogiro using a pump take-off, it thus follows that the lift on the blades is not now twice as great as previously at forward phases of rotation, and not now zero at trailing phases of rotation as would be the case were the centrifugal forces instantaneously effective upon the blade a direct measure of the lift forces thereon. Rather, what has come into being is an inertia force effective upon the blade at its center of percussion, the mean value of which approximates the mean value of the transverse component of the centrifugal forces, and hence also of the lift, effective through the same point.

Initiated by transverse lift asymmetry resultant to forward flight, the advancing blade is lifted from its static coning position by increased lift on the blade. This increased lift imposes upward movement to the blade transverse to the static plane of rotation. This upward movement is arrested or damped by the increased centrifgual component opposing it through increased coning of the blades. The blade meanwhile has rotated through an angle of approximately 90° at which position the lift has decreased. Centrifugal forces now act to give the blade downward movement in a fashion analogous to gravity effective upon a pendulum at the end of a beat. Here the direct comparison with a pendulum ceases, however, for although downward inertia has been imparted to the blade mass, the increased lift on the blade resultant to this downward motion acts to absorb the energy of the down beat before the blade passes a position in alignment with the direction of centrifugal action (corresponding to the bottom of the pendulum's arc). In brief, at trailing phases of rotation, the force opposed to the lift on the blade is not so much centrifugal as it is a downward inertia instigated thereby. And after damping out this later force, lift on the blade now instigates an upward movement of the blade mass which is initially resisted by the inertia of this mass alone.

When taken by itself, the flapping action of the blade during translation is thus seen to consist of nothing more involved than a simple reciprocating action in which a given mass is bounced back and forth between two damping means, there being a power input on the advancing blade by reason of increased lift and a power output on the retreating blade by reason of increased velocity of the blade. Since smoothness of operation in a rotor is not effected by the addition of such a reciprocating motion or "flapping" of the blade during translational flight, the problem is seen to be one of introducing such oscillation to a rotor blade during static flight conditions so that the power input involved in raising the blade may be utilized as a counter-torque force.

This problem may be approached in two different ways. One is to consider that a wedge or other inclined surface is imposed between a blade's point of articulation and its center of percussion, thereby throwing it upward from its normal static plane of rotation. As in the case of the advancing blade, the latter's inertia resists such upward movement, thereby imposing a force on the wedge tending to turn it about the rotor's axis of rotation and in the same direction as the rotor rotation. Once oscillation is thus initiated it follows that the force required to lift the blade to the same height in the succeeding revolution will be a measure only of the work done on the down beat of the blade plus friction generated through mechanical disalignment of moving parts. If, however, the wedge be moved counter-rotationally during each revolution then obviously more force is required to raise the blade. In brief, if the frequency of transverse oscillation be thus increased over the rotational frequency of the blade by such a mechanical means, a counter-rotational force of considerable magnitude is thus generated.

After apparatus had been set up and the original hypothesis validified, the second approach to the problem came to be considered. This arose through observation that the frequency of the counter-rotational "wobble" when the rotor was operating smoothly was of the same order as the moment of precession of a conventional gyroscope. While the direction of movement of the "wobble" was opposite to that of a gyroscope of similar proportions, nevertheless the tendency for a given propeller to pick up a certain frequency of "wobble" in company with a definite "degree" of wobble was so marked that the parallelism to the gyroscope's moment of precession could not be ignored. Hence, by inducing counter-rotational "wobble" to the rotor as a whole, effective anti-torque forces are brought into being.

Accordingly, as will appear from the above considerations, the object of this invention is broadly the provision of an anti-torque mechanism for helicopters and like machines having a single lifting propeller or rotor which acts to vary the frequency of periodic movement of a rotor blade transverse to its normal plane of rotation with respect to the rotational frequency of the same blade.

Another object is the provision of a mechanism as aforesaid for inducing periodic movement of a rotor blade in planes transverse to the blade's normal plane of rotation, and which is capable of rotational movement relative to the rotor as a whole so that it acts to vary the frequency of the transverse movement thus induced with respect to the rotational period of the rotor.

A further object is the provision of an anti-torque device which derives its effectiveness through inducing counter-rotational wobbling of the rotor as a whole.

Yet another object is the provision of means for inducing a counter-rotational wobbling of a rotor mounted for universal movement about its axis of rotation and driven in conventional manner through a rotor drive shaft.

Still another object is the provision of an adjustable wedge which may be imposed in the normal plane of rotation of a rotor blade intermediate its center of percussion and its axis of rotation thereby setting up transverse oscillation of the blade, together with means for providing counter-rotational movement of the wedge.

Another object is the provision of a rotor blade mounting by which the blades are restrained from articulative movement while being forced upward from their normal plane of rotation by a counter-rotating torque plate or equivalent structure, but which releases the restraining means with downward movement so that the blade is free to choose its own position under the influence of lift and inertia forces effective thereon.

Ancillary objects of the invention will be apparent from the following description thereof, taken with the accompanying drawings, in which—

Fig. 1 is a plan view of a helicopter having a lifting propeller or rotor mounted for wobbling by means of a torque plate according to the invention;

Figure 3:
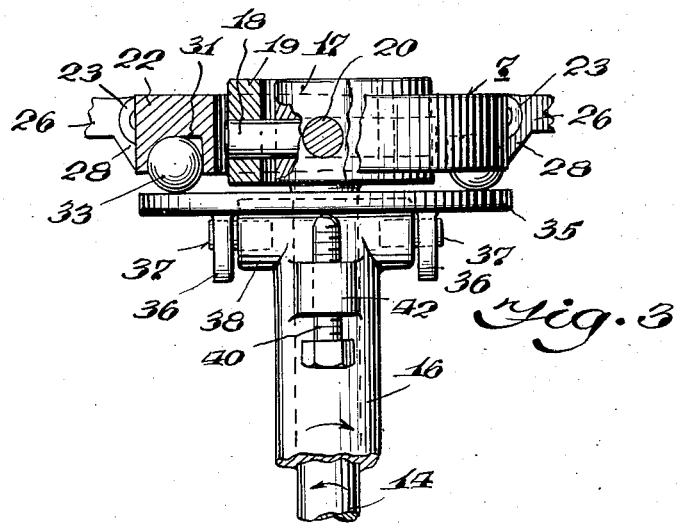

Fig. 3 is a similar view of the rotor mounting and levelled torque plate as seen from the rear thereof in Fig. 1; and Fig. 4 is a diagrammatic view taken in side elevation of a rotor being counter-rotationally wobbled by means of a torque plate according to the invention and showing the paths taken by successive blades of the rotor, the relative rate of counter-rotational wobble and the angular degree of the same.

Referring to the drawings, a fuselage 6 (Fig. 1) has mounted upon it a three-bladed lifting propeller 7 driven through speed reduction gearing from an engine (not shown) carried by the fuselage, the general arrangement of parts being in accordance with accepted engineering practice. At the tail of the fuselage, a horizontal tail surface 8 carries vertical panels 9 and 10 at its outer ends which may be turned about their span axes through an angle Z thereby giving them an attack angle to the airstream resultant to translation and thus providing anti-torque force suitable for preventing rotation of the fuselage during such phases of flight, as is well known in the art.

Figure 2:
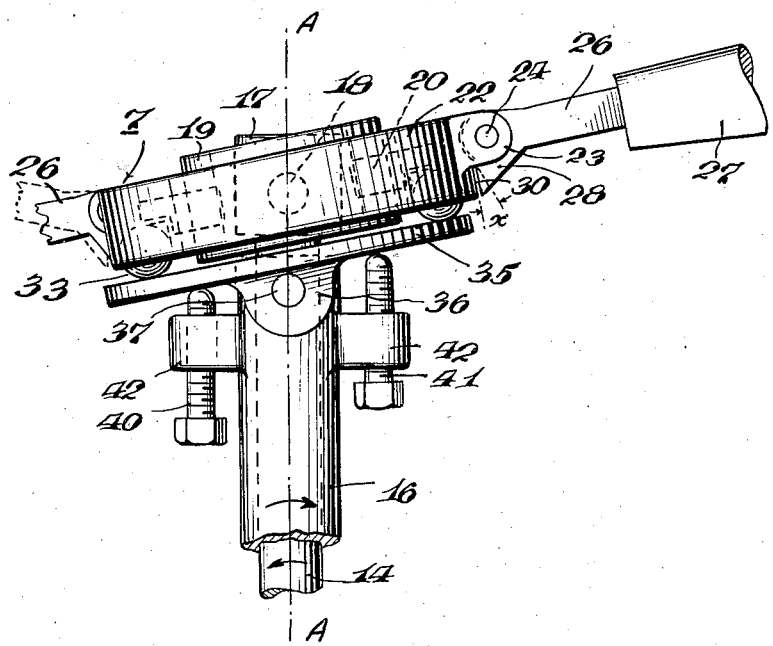
Fig. 2 is a part sectional view illustrating the rotor mounting and torque plate as such are seen from a side thereof in Fig. 1.

The gear reduction used is preferably of the type disclosed in my copending application Serial No. 496,917, filed July 31, 1943, in which two concentric shafts are driven with equal torques and because of the differential intermediate them the torque applied is always equal and opposite regardless of the R. P. M. of the respective shafts. According to the present invention, shafts 14 and 16 (Figs. 2 and 3) extending above a pylon (not shown) and carrying respectively the rotor 7 and a torque plate 35, to be described, are so driven.

The inner shaft 14 at its upper end is formed as or provided with a head 17 which carries pins or trunnions 18 on which are mounted the ring 19 of a universal joint. The ring 19 in turn carries pins 20 providing trunnions on which is mounted a circular rotor hub or center plate 22. This plate is provided with three symmetrically disposed sets of blade hangers 23 extending from the upper edge of its outside surface, which carry pins 24 upon which are mounted blade butt arms 26 of the rotor blades 27. At their inner ends and beneath the pins 24 the blade butt arms are each formed with a flange 28 which abuts the outer face 30 of the center plate 22 to prevent the blades 27 dropping below a position in which their span axes are substantially parallel with the rotor center plate; upward movement of the blades causing movement of the flange away from the face 30 through an angle X.

The rotor center plate 22 on its under face is provided with a ball groove or race 31 seating the ball bearings 33 which extend below the plate to contact the circular torque plate 35 held in intimate contact with bearings 33 by conventional means (not shown) so that the rotor plate tracks on and takes its position from the plate 35. The latter plate carries downwardly extending hangers 36 mounted upon pins 37 carried by a head 38 of the outer drive shaft 16. Immediately below its head and transverse thereto, the shaft 16 is provided with oppositely projecting threaded ears 42 which carry adjustment bolts 40 and 41 acting to impose a variable tilt angle to the torque plate 35 relative to its axis of rotation A—A, and hence a similar degree of tilt to the rotor center plate 22 and to the blades 27 mounted thereon.

According to the described arrangement, the invention thus provides a rotor mounted for universal movement about its axis of rotation A—A, the hub or center plate 22 of the rotor taking its position from a similar plate 35 mounted to turn with outer shaft 16 concentric with the rotor drive shaft 14 and having a torque equal and opposite in direction. Thus, while the rotor shaft acts to drive the rotor in conventional manner, tilting of the plate 35 carried by the shaft 16 from the relative horizontal acts to induce a counter-rotational wobbling of the rotor, resulting in periodic movement or oscillation of a rotor blade in planes transverse to the blade's normal plane of rotation. By varying the tilting angle of the plate 35, and the relative rate of rotation thereof, both the degree and frequency of wobble can be varied to satisfy the requirements of or to obtain the optimum values for a particular machine.

In operation, assuming the torque plate is tilted by the adjustment screws 40, 41 to an angular position corresponding to the desired degree of "wobble," the engine is started with the outer shaft 16 locked to prevent its rotation as by means of the brake shown in my copending application Serial No. 496,917, referred to above. After the rotor 7 has been brought up to a speed slightly below its normal operating R. P. M. the brake on the shaft 16 is gradually released whereupon it begins to turn slowly in a direction opposed to that of the rotor and thereby imposes upon the latter a slow wobbling movement which might be described as a recessional movement in which Y (Fig. 4) represents the angle of rotor tilt and M the distance of counter-rotational travel of the high point attained by each blade per revolution.

It is thus seen that according to the operation aforesaid and for hovering flight, each blade may have imposed upon it at a certain phase of rotation an upward movement which is resisted not alone by the mass of the blade but also by the transverse component of the centrifugal force effective upon the blade so that the force opposed to such movement acts through the blade's center of percussion. This supplies a power input to the blade and hence it may swing upward about the pivot 24 until this inertia has been damped by a transverse component of the centrifugal forces thereon, even though the pin 24 has begun downward movement. The kinetic energy thus stored in the blade is now available to accelerate its downward travel in a manner analogous to the "flapping" of a conventional rotor blade during translation.

This action of the blades will be clarified when it is considered that with the plate 35 acting as a counter-rotating wedge determining the planes of rotation of the rotor center plate, and with the blades being prevented by the abutment flanges 28 from dropping below a position in which their span axes are substantially parallel with the plane of rotation of the center plate, a blade is restrained from articulating about the pins 24 while being forced upward from their normal plane of rotation with upward movement of the center plate. This restraint is released, however, with lowering or return movement of the rotor center plate during which the blade may swing upwardly of the center plate. Hence, a blade in this latter phase of rotation is free to choose its own position under the influence of lift and inertia forces effective thereon, so that the kinetic energy stored therein is free to act on the blade as above described.

If the drive shafts 14 and 16 now be tilted forward by any of several means well known in the art, translational travel of the system results. Such travel makes the anti-torque panels 9 and 10 of the fuselage effective and hence, with translation, rotation of the shaft 16 may now be stopped by applying the shaft brake and the plate 35 leveled by adjustment screws 40 and 41, whereupon the rotor 7 operates in conventional manner.

Since the rotor 7 imposes reactive counter-torque forces on the torque plate 35, the rotor is preferably of the three-bladed type as shown whereby to equalize the counter-torque forces effective on the torque plate.

As other applications of the anti-torque mechanism according to the invention and/or of the use of a torque plate as described in conjunction with other types of anti-torque devices may be utilized without departure from the principle disclosed, it is intended that all matter contained in the description and illustrated in the drawings shall be interpreted as illustrative and not in a limiting sense.

I claim:

1. Anti-torque mechanism for helicopters having a rotor comprising means for inducing periodic movement of a rotor blade in planes transverse to the blade's normal plane of rotation, means for imparting rotational movement to said first means in such manner that the latter acts to vary the frequency of the periodic transverse movement with respect to the rotational period of the rotor.

2. Anti-torque mechanism for helicopters having a rotor comprising the combination of means for driving said rotor, means for inducing counter-rotational wobble of the rotor as a whole about its axis of rotation, said rotor comprising a blade supporting member and blades mounted to articulate with respect thereto, and means restraining the blades from articulative movement when forced upward from their normal plane of rotation as the rotor wobbles and for releasing such restraint with downward movement whereby during the latter movement a blade is free to choose its own position under the influence of lift and inertia forces thereon.

3. Anti-torque mechanism for helicopters having a rotor comprising the combination of means for driving said rotor, means functioning as a wedge interposed in the normal plane of rotation of a rotor blade intermediate its center of percussion and its axis of rotation for inducing transverse oscillating of the blade, and means for imparting counter-rotational movement to said wedge means.

4. Anti-torque mechanism for helicopters having a rotor comprising, in combination, a rotor blade mounting relative to which a blade may articulate, means for rotating said mounting, means functioning as a wedge interposed in the normal plane of rotation of the blade intermediate its center of percussion and the axis of rotation of the rotor for inducing periodic upward and return movement to said mounting, means for imparting counter-rotational movement to said wedge means, and means restraining articulating movement of the blade relative to said mounting as the latter is moved upwardly and for releasing such restraint with return movement of said mounting.

5. Anti-torque mechanism for helicopters having a rotor comprising, in combination, means mounting said rotor for universal movement about its axis of rotation, said mounting means including a rotor plate and blades articulatively connected to said plate for relative upward and return movement, means for rotating said rotor, and means for inducing counter-rotational wobble of the rotor plate and hence of the rotor as a whole.

6. Anti-torque mechanism for helicopters having a rotor comprising, in combination, means mounting said rotor for universal movement about its axis of rotation, said mounting means including a rotor plate and blades articulatively connected to said plate for relative upward and return movement, means for rotating said rotor, means for inducing counter-rotational wobble of the rotor plate and hence of the rotor as a whole, and means for varying the frequency and degree of wobble.

7. Anti-torque mechanism for helicopters having a rotor comprising, in combination, means mounting said rotor for universal movement about its axis of rotation, said mounting means including a rotor plate and blades articulatively connected to said plate for relative upward and return movement, means for rotating said rotor, and counter-rotating means operative through said rotor plate for imparting wobbling movement to said plate and hence to the rotor as a whole.

8. Anti-torque mechanism for helicopters having a rotor comprising, in combination, means mounting said rotor for universal movement about its axis of rotation, said mounting means including a rotor plate and blades articulatively connected to said plate for relative upward and return movement, means for rotating said rotor, a tiltable member operative to determine the angular position of the rotor plate throughout its phases of rotation, and means for tilting said member.

9. Anti-torque mechanism for helicopters having a rotor comprising, in combination, means mounting said rotor for universal movement about its axis of rotation, said mounting means including a rotor plate and blades articulatively connected to said plate for relative upward and return movement, means for rotating said rotor, a tiltable member for determining the angular position of the rotor plate, means for tilting said member, and means for rotating said member in direction opposite to that of the rotor plate and with equal torque.

10. Anti-torque mechanism comprising, in combination, a rotary plate mounted for universal movement about an axis of rotation, a tiltable plate coacting with said rotary plate to determine the angular position of the latter in its various phases of rotation, and means for driving said plates in opposite directions and with equal torque.

11. Anti-torque mechanism comprising, in combination, a rotary plate mounted for universal movement about an axis of rotation, a tiltable plate disposed relatively below the rotary plate, means operative between said plates to cause the rotary plate to track on the tiltable plate and thereby to assume angular position during its various phases of rotation as determined by the angle of tilt of the latter plate, and means for driving said plates in opposite directions and with equal torque.

12. Anti-torque mechanism comprising, in combination, a rotary plate mounted for universal movement about an axis of rotation, a tiltable plate disposed below said rotary plate for determining the angular position of the latter in its various phases of rotation, bearings operative between said plates, means for tilting and leveling said tiltable plate, and means for driving said plates in opposite directions and with equal torque.

13. Anti-torque mechanism for helicopters having a rotor comprising the combination of coaxial shafts, one of said shafts driving said rotor and cooperating means on the other of said shafts and said rotor for inducing counter-rotational wobbling of the rotor about its axis of rotation.

RUSSELL R. HAYS.